United States Patent
Smith et al.

(10) Patent No.: US 6,866,516 B2
(45) Date of Patent: Mar. 15, 2005

(54) TEACHING AIDS

(75) Inventors: Aaron W. Smith, Wooster, OH (US); Timothy D. Killinger, Wooster, OH (US)

(73) Assignee: Rubbermaid Incorporated, Wooster, OH (US)

( * ) Notice: Subject to any disclaimer, the term of this patent is extended or adjusted under 35 U.S.C. 154(b) by 0 days.

(21) Appl. No.: 10/442,491

(22) Filed: May 21, 2003

(65) Prior Publication Data

US 2004/0234939 A1 Nov. 25, 2004

(51) Int. Cl.[7] .................................................. B43L 1/00
(52) U.S. Cl. ...................................................... 434/408
(58) Field of Search ................................ 434/408, 413, 434/416, 422, 423, 425, 427

(56) References Cited

U.S. PATENT DOCUMENTS

| | | | | |
|---|---|---|---|---|
| 1,757,287 A | * | 5/1930 | Bildstein | 434/408 |
| 4,968,258 A | * | 11/1990 | Kees | 434/370 |
| 5,110,295 A | * | 5/1992 | Concra | 434/88 |
| 5,207,581 A | * | 5/1993 | Boyd | 434/412 |
| 5,367,350 A | * | 11/1994 | Winfrey | 353/120 |
| 5,599,189 A | * | 2/1997 | Kees | 434/370 |
| 5,655,323 A | * | 8/1997 | Lassoff | 40/611.1 |
| 5,833,790 A | * | 11/1998 | Hare | 156/240 |
| 6,241,528 B1 | * | 6/2001 | Myers | 434/408 |
| 6,470,536 B1 | * | 10/2002 | Kettlestrings et al. | 24/67.7 |
| 6,484,425 B1 | * | 11/2002 | Hirsch | 40/406 |
| D474,966 S | * | 5/2003 | Schrem et al. | D9/433 |
| 6,637,774 B2 | * | 10/2003 | Gaska | 281/45 |

* cited by examiner

*Primary Examiner*—Kurt Fernstrom
(74) *Attorney, Agent, or Firm*—Marshall, Gerstein & Borun LLP

(57) ABSTRACT

A dry erase panel assembly for use as a teaching aid includes a first panel with a top edge, a bottom edge, a left edge, and a right edge. The first panel includes a writing section that is adapted to eraseably receive markings thereon. The panel assembly further includes a second panel with a top edge, a bottom edge, a left edge, a right edge, and a holding section. The second panel is secured to the first panel along the left edge and the right edge, whereby the holding section is spaced from the writing section to define a gap therebetween adapted to receive an information template.

23 Claims, 9 Drawing Sheets

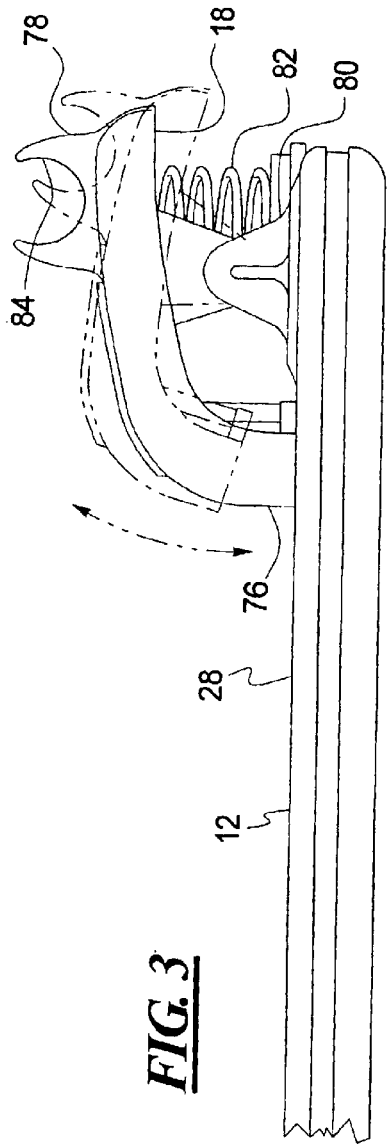
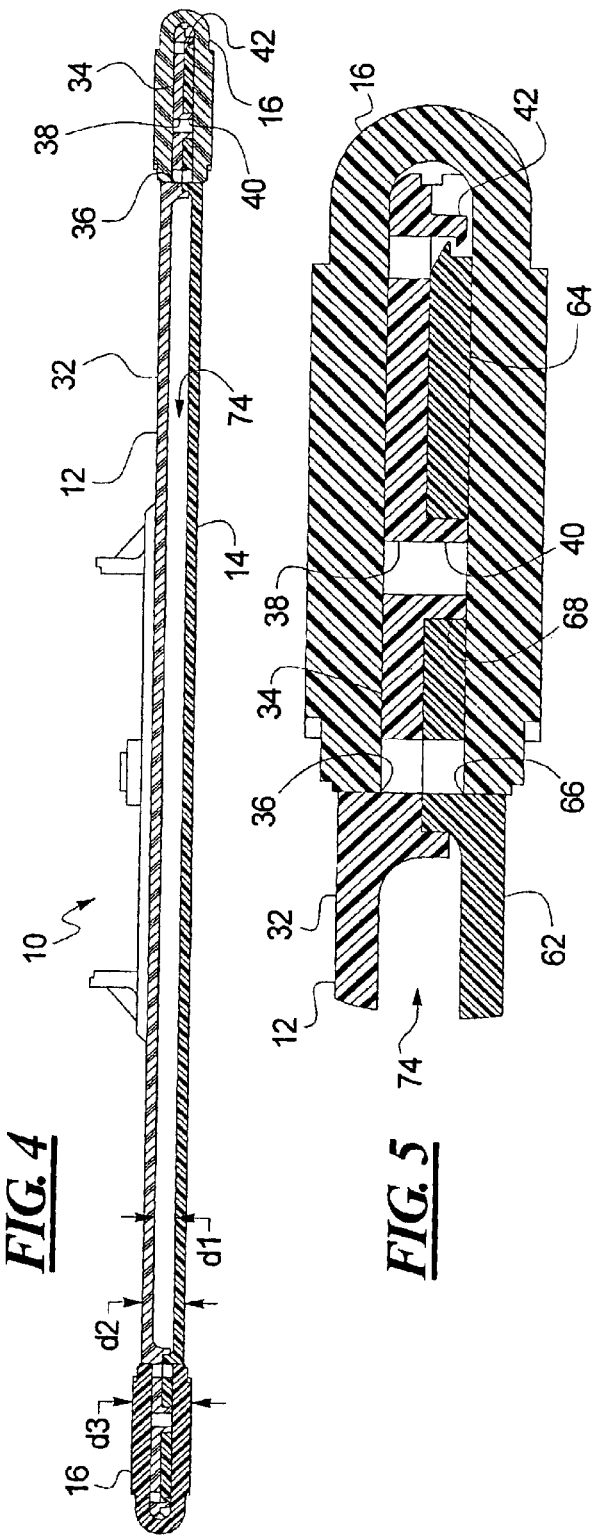
FIG. 3
FIG. 4
FIG. 5

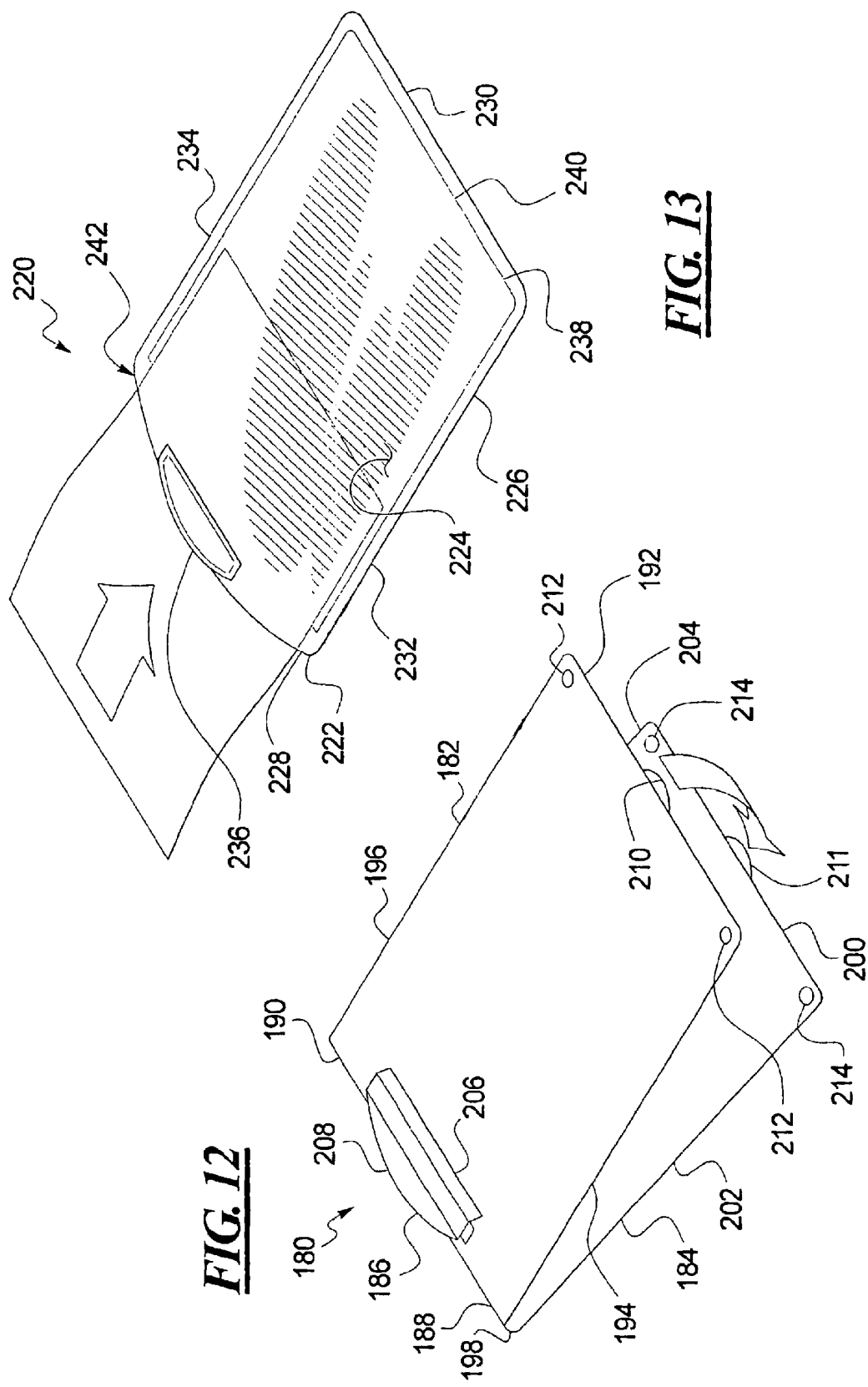

TEACHING AIDS

FIELD OF THE INVENTION

This disclosure relates to clipboards, and more particularly relates to clipboards with an erasable surface and a receiver for a template.

BACKGROUND OF THE INVENTION

Teachers, parents, and coaches are constantly looking for new resources to aid in the education process in the school room, the athletic arena, and the like. Educators would ideally like to have cost effective products that are also reusable as aids for the students to use when they are performing their lessons. Further, educators need items that organize the supplies that the students use while performing their lessons.

When performing lessons such as English or math, students typically have either a book that can be directly written in, or they have a book with problems that must be answered on a separate piece of paper. In the first case, the book can only be used once and is then discarded. The next year the students must get new books. Generally, young children require these books because they have difficulty transferring the elements of the problem to another sheet of paper. In the second case, while the books may be reused, the paper on which the problems are solved is generally discarded. In either case, a great deal of paper waste is created.

To combat this problem, some teachers have started using dry erase boards. In this situation, the teacher gives the work to the child, and the child then must print the answers on the dry erase board. This provides the child a space on which to work while not creating any paper waste. However, the difficulty for a young child to transfer the elements of the problem from the paper handed by the teacher to the dry erase board remains. Further, the paper handed out by the teacher is loose, and may get lost or damaged.

BRIEF DESCRIPTION OF THE DRAWINGS

Objects, features, and advantages of the present invention will be apparent upon reading the following description in conjunction with the drawing figures, in which:

FIG. 3 is a side view of the clipboard of FIG. 1.

FIG. 4 is a section view of the clipboard taken along line IV—IV in FIG. 2.

FIG. 5 is a detail view taken along the line V in FIG. 4.

FIG. 12 is a perspective view of a third example of a dry erase clipboard constructed in accordance with the teachings of this disclosure.

FIG. 13 is a perspective view of a fourth example of a dry erase clipboard constructed in accordance with the teachings of this disclosure.

DETAILED DESCRIPTION

There is a need for a compact apparatus that combines the reusability of a dry erase board with the ease of a book that can be directly written in. A transparent clipboard with a receiver is disclosed herein and described in conjunction with the accompanying drawings. In general, the top panel of the clipboard is made from a transparent material that serves as a dry erase surface for a marker and includes a pocket for receiving a sheet of paper or a template. The clipboard may include ergonomic side panels.

Figure 1:
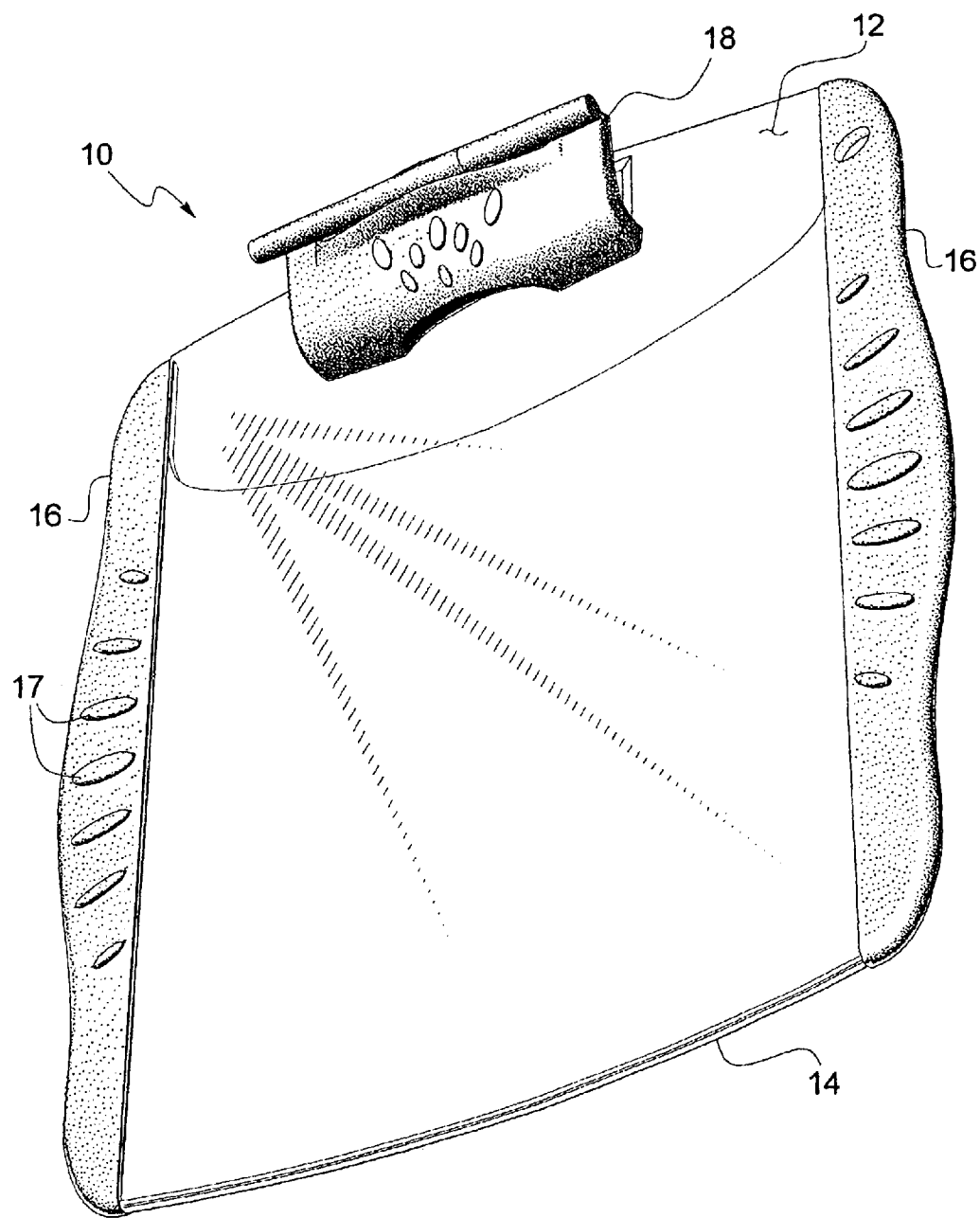
FIG. 1 is a perspective view of a first example of a clipboard with an erasable surface constructed in accordance with the teachings of this disclosure.

Referring now to the drawings, and specifically FIG. 1, one example of a clipboard 10 is disclosed in accordance with the teachings of this disclosure. The clipboard 10 includes a top panel 12, a bottom panel 14, grips 16, and a clip 18 disposed on the top panel 12.

Figure 2:
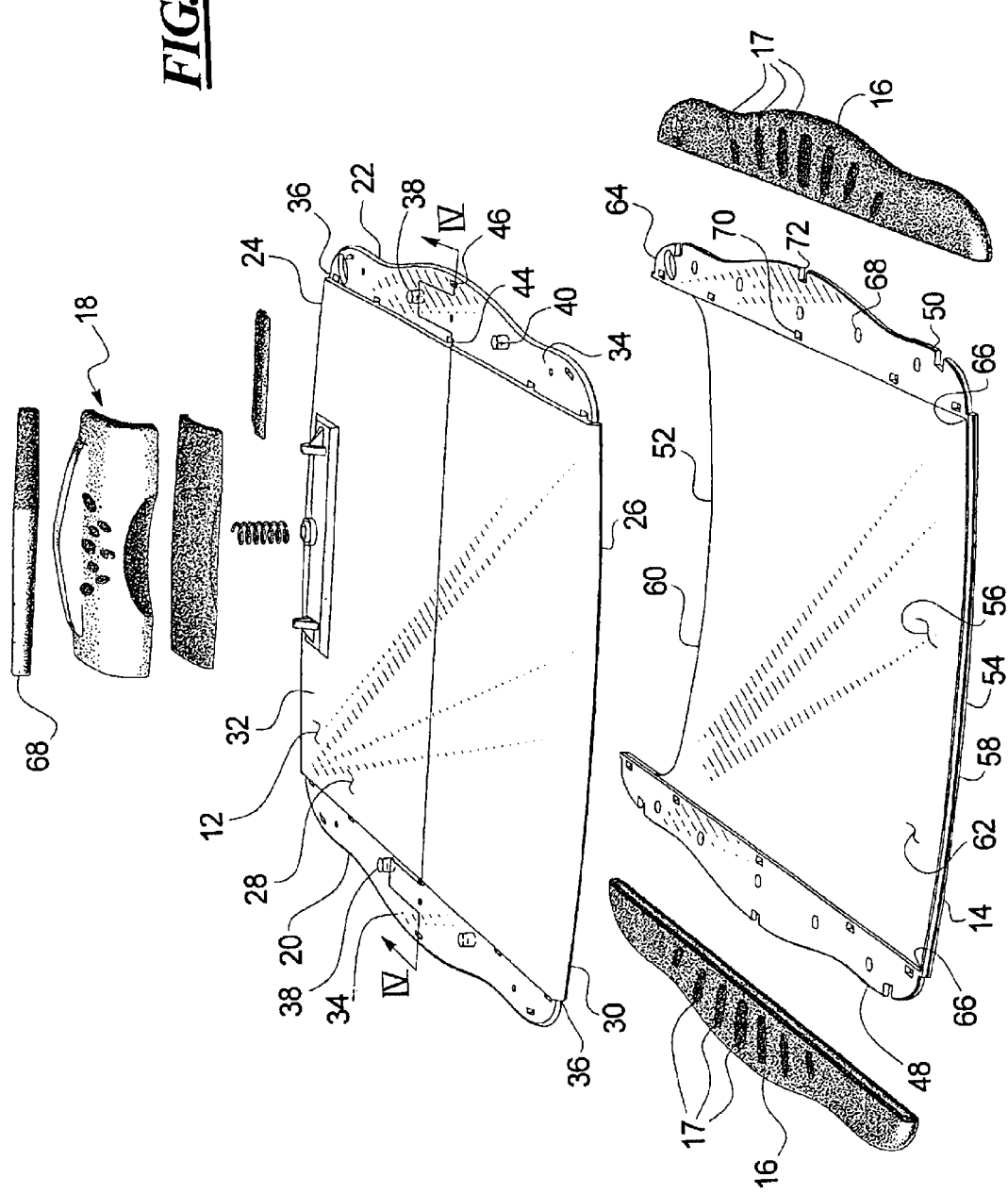
FIG. 2 is an exploded view of the clipboard of FIG. 1.

As best seen in FIG. 2, the top panel 12 includes a left edge 20, a right edge 22, a top edge 24, a bottom edge 26, a top face 28, and a bottom face 30. The top panel 12 further includes a writing section 32 and a pair of fastening sections 34 integral with the writing section 32, which in this example meet at a step 36 (seen best in FIGS. 4 and 5). Thus, the writing section 32 is at a first elevation, and the fastening sections 34 are at a second elevation. The fastening sections 34 run along the left and right edges 20, 22.

Disposed on the fastening sections 34 are a series of locator holes 38 that extend through the top panel 12. On the bottom face 30 of the top panel 12, a rim 40 surrounds the locator holes 38. Further, a series of hooks 42 extend downward and inward (see FIG. 4). Finally, a first set of flow holes 44 and a second set of flow holes 46 are disposed in fastening sections 34.

The top panel 12 can be manufactured from a material that can receive the markings of a dry erase marker which then can be swiftly and easily removed. Any substance known in the art used in dry erase boards, such as a polycarbonate, can be used. Further, it is desirable that the top panel 12 be manufactured from a transparent material, as will be later detailed.

The bottom panel 14 includes a left edge 48, a right edge 50, a top edge 52, a bottom edge 54, a top face 56, and a bottom face 58. The top edge 52 is curved or scalloped toward the bottom edge 54 and defines a scallop 60. The bottom panel 14 also includes a holding section 62 and a pair of fastening sections 64 disposed along the left and right edges 48, 50 on either side of the holding section 62. In this example, the holding section 62 and the fastening sections 64 meet at a step 66. Thus, the holding section 62 is at a first elevation, and the fastening sections 66 are at a second elevation.

On the fastening sections 66, a series of locator holes 68 are disposed. The locator holes 68 of the bottom panel 14 have an inside diameter similar to the outside diameter of the rim 40 of the top panel 12. Further, a first set of flow holes 70 are disposed in the fastening sections 64. The first set of flow holes 70 of the bottom panel 14 are aligned or concentric with the first set of flow holes 44 of the top panel 12 when the panels are connected as shown in FIGS. 1, 3, and 4. Finally, the fastening sections 64 of the bottom panel 14 include a ridge 72 along the left edge 48 and right edge 50.

Thus, when the top panel 12 is assembled to the bottom panel 14, the bottom face 28 of the top panel 12 is placed adjacent the top face 56 of the bottom panel 14, and the fastening sections 34 of the top panel 12 are disposed on the fastening sections 64 of the bottom panel 14. The rims 40 of the top panel 12 are inserted into the corresponding locator holes 68 of the bottom panel 14, and the hook 42 of the top panel 12 engages the ridge 72 of the bottom panel 14. The top panel 12 is thereby positively located and secured to the bottom panel 14.

Due to the step 36 of the top panel 12 and the step 66 of the bottom panel 14, the writing section 32 and the holding section 62 are in a spaced relationship when assembled. Thus, a gap 74 with a distance d1 exists between the writing section 32 and the holding section 62. A panel height d2 is defined as the height between the top surface 28 of the top panel 12 and the bottom surface 58 of the bottom panel 14.

The clipboard 10 includes a pair of grips 16 that are disposed around the fastening sections 34, 64 of the top panel 12 and the bottom panel 14, as seen in FIG. 4. The grips 16 aid in maintaining the panels together. Further, the grips 16 can be ergonomically designed to help the user grasp and manipulate the clipboard 10, as well as including indicia 17 adapted to direct the attention of the user to the writing section 32.

The grips 16 define a height d3. The grip height d3 can be greater than the panel height d2. This ensures that when the clipboard 10 is placed on or slid across a table or other setting, the bottom panel 14 will not be in contact with the table.

The grips 16 can be molded to the panels 12, 14 via insert molding after the panels 12, 14 have been assembled together. The assembled panels 12, 14 are placed in a mold and held fast, then resin is injected into the mold and is cooled. Is this manner, the resin that forms the grips 16 flows into the flow holes, thereby aiding in maintaining the panels 12, 14 and the grips 16 together. Further, the panels 12, 14 and the grips 16 can be made of known materials that bond when subjected to heat. In a further example, the grips 16 can be made from a flexible material and include bosses (not shown) that, when disposed on the fastening sections 34, 64, can be placed into the flow holes.

The clipboard 10 also may include a clip 18 with a front portion 76 and a lever portion 78. The clip 18 can be mounted to the top face 24 of the top panel 12 via a pair of hinges 80 (See FIG. 3). The clip 18 includes a spring 82 that biases the lever portion 78 such that the front portion 76 is resiliently urged toward the top face 24 of the top panel 12. The lever portion 78 may also include a receiver 84 sized to maintain a writing utensil 86, such as a dry erase marker, via a friction fit or any other fit known in the art.

In use of the clipboard 10, markings may be placed on the top panel 12 by a dry erase marker for temporary purposes. This can include note taking, instructions, etc. The markings may then easily be wiped off.

Figure 6:
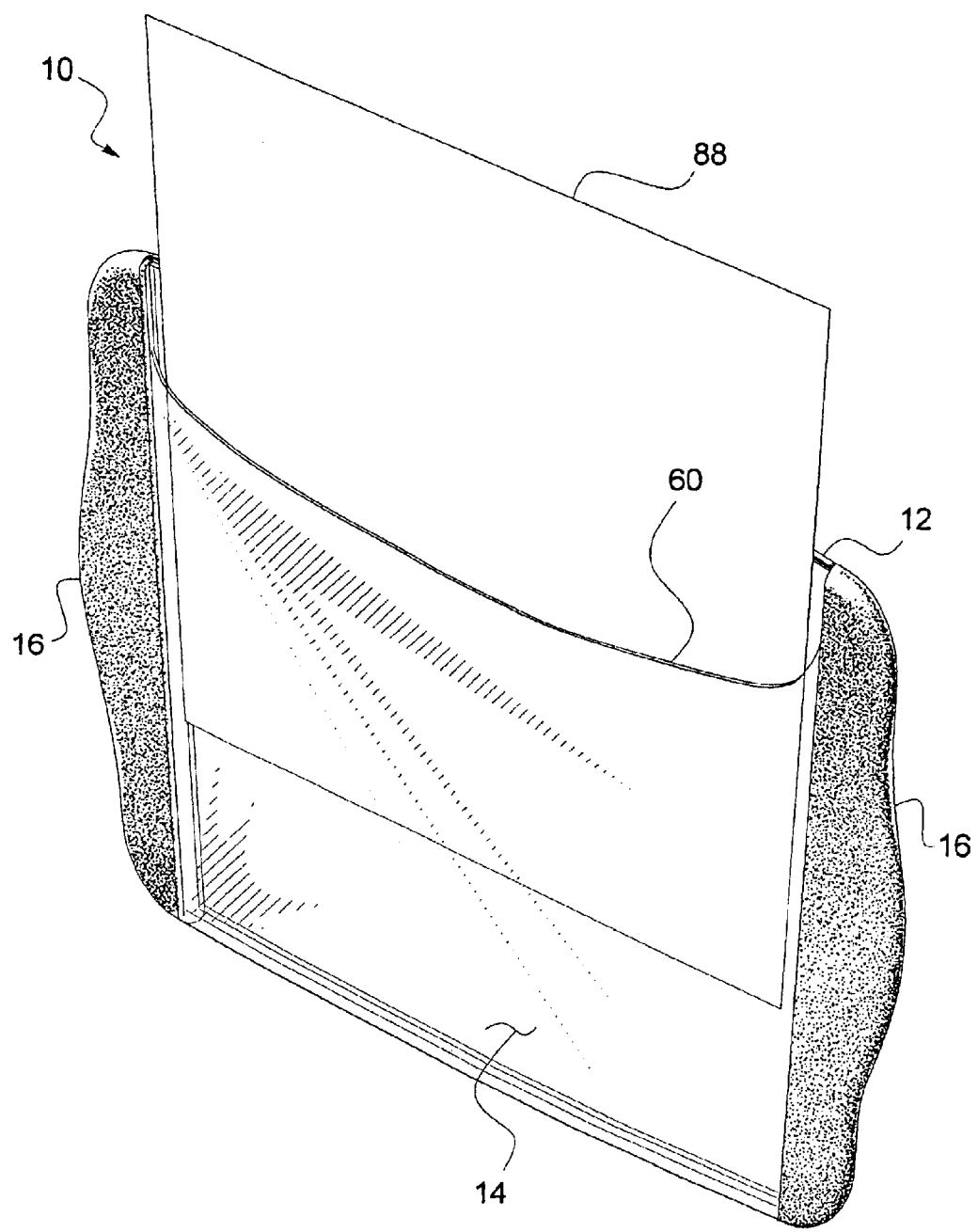
FIG. 6 is a perspective assembly view of the clipboard taken from the backside and showing a sheet of paper being inserted.
Figure 7:
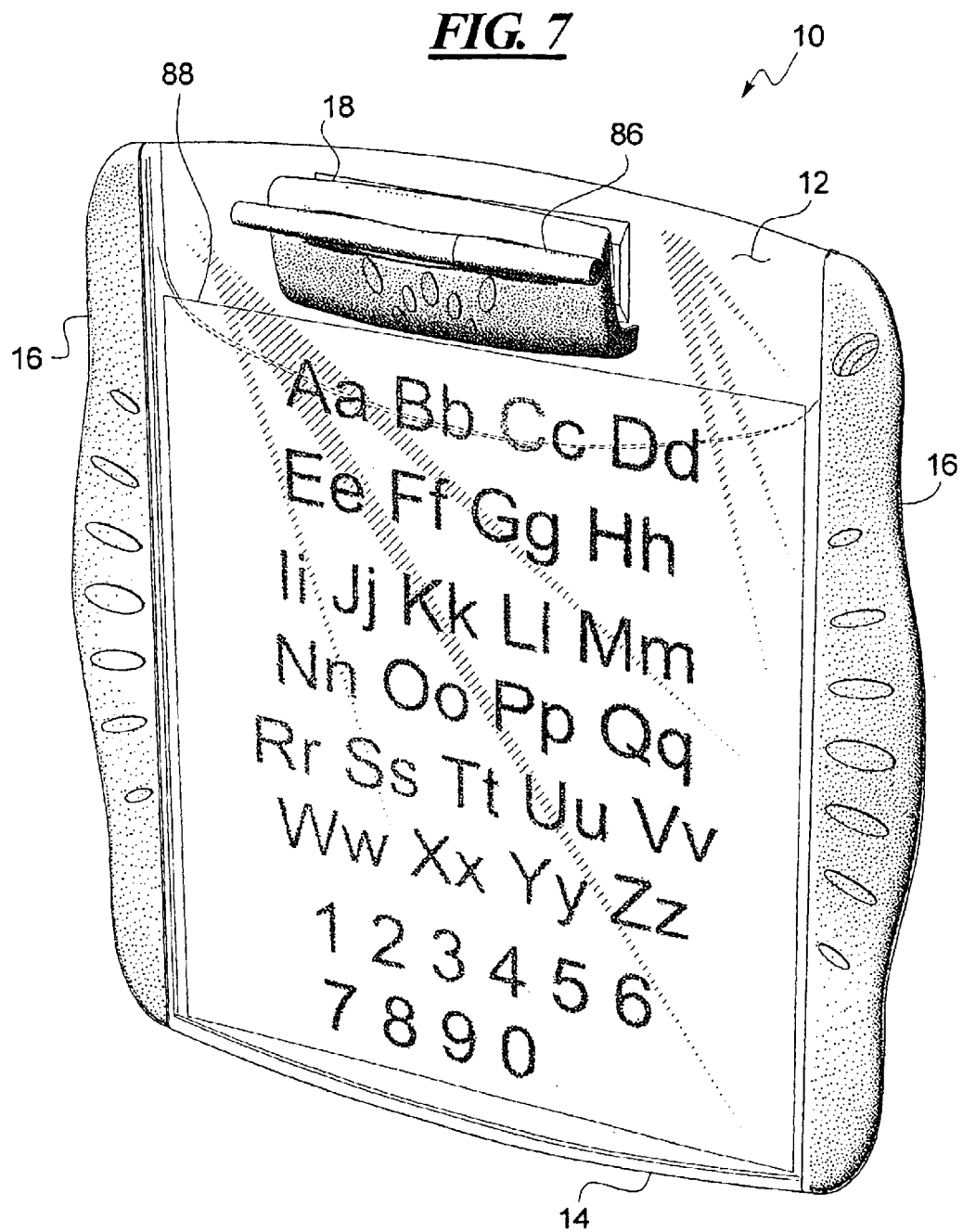
FIG. 7 is a perspective assembly view of the clipboard showing a sheet of paper inserted therein.
Figure 8:
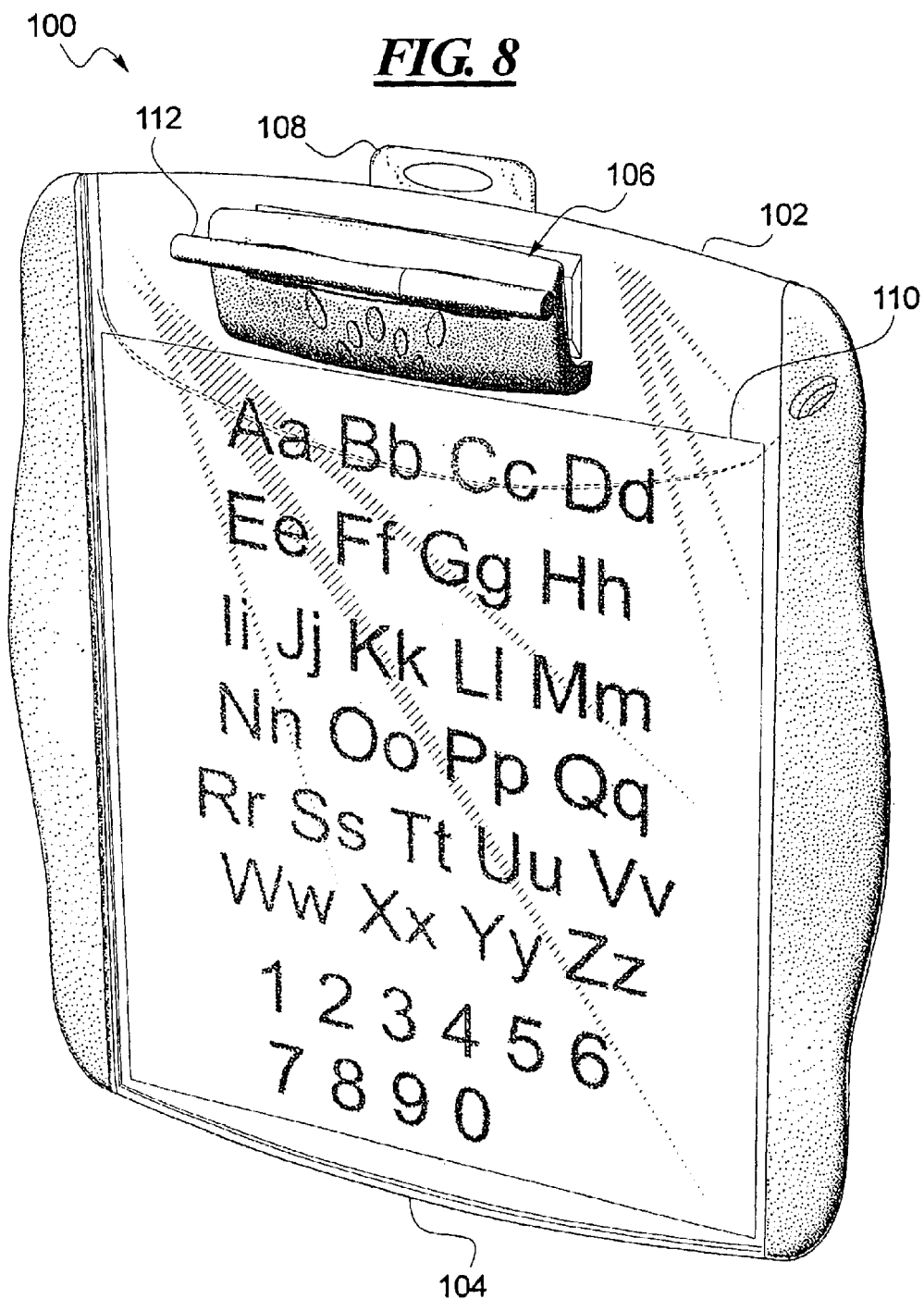
FIG. 8 is a perspective assembly view of a second example of a clipboard with an erasable surface.
Figure 9:
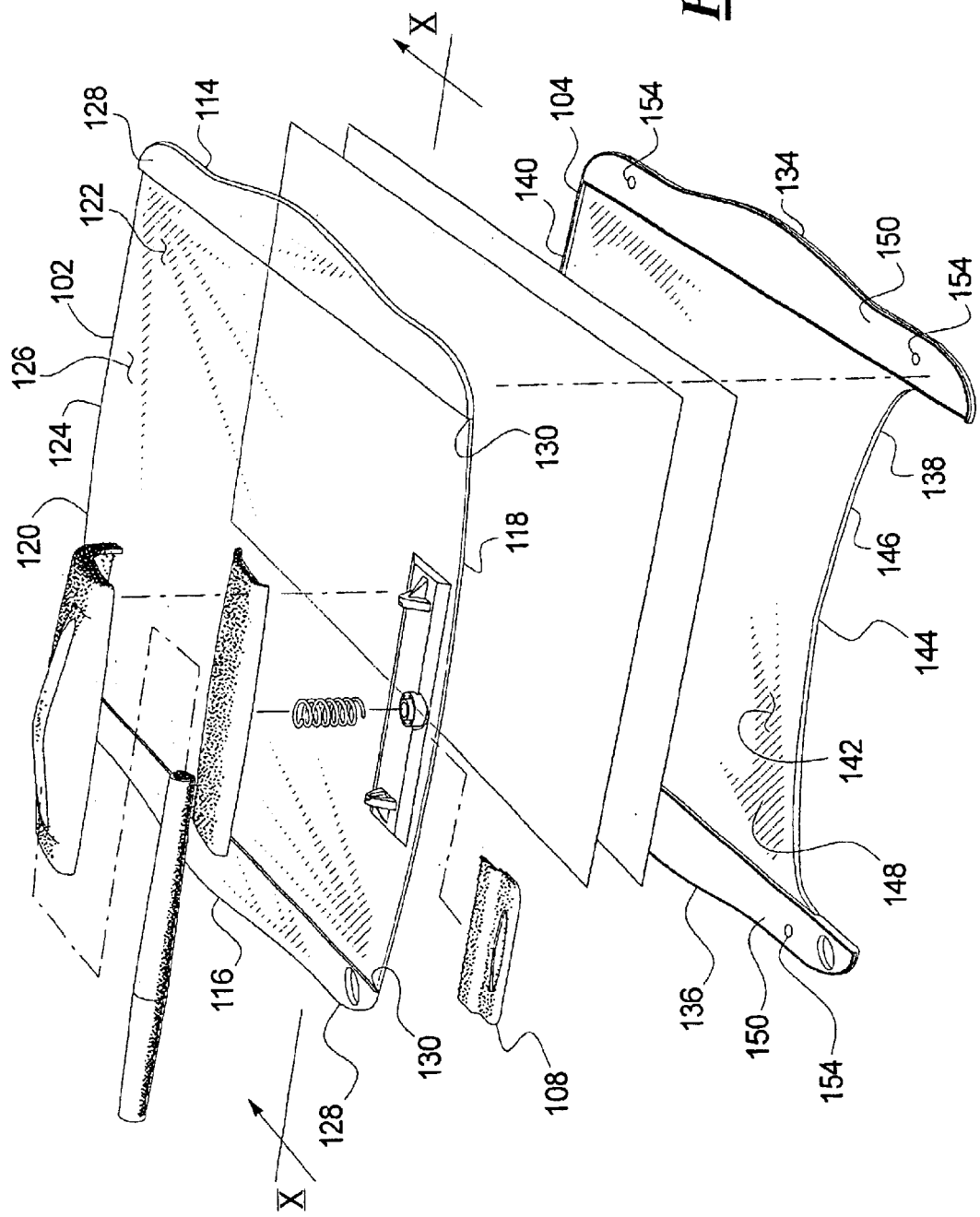
FIG. 9 is an exploded view of the clipboard of FIG. 9.
Figure 10:
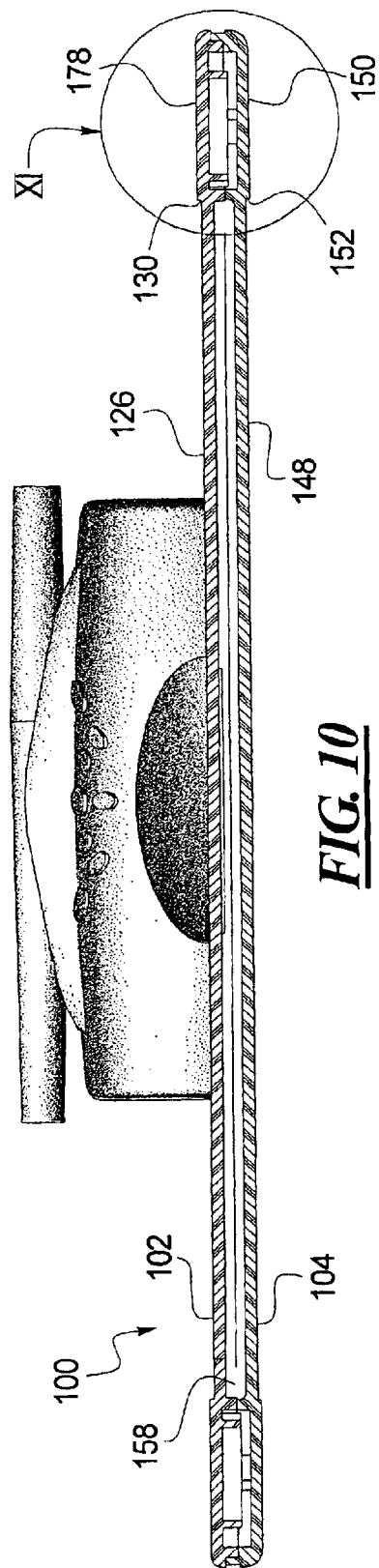
FIG. 10 is cross-sectional view of the clipboard taken along line X—X in FIG. 8.
Figure 11:
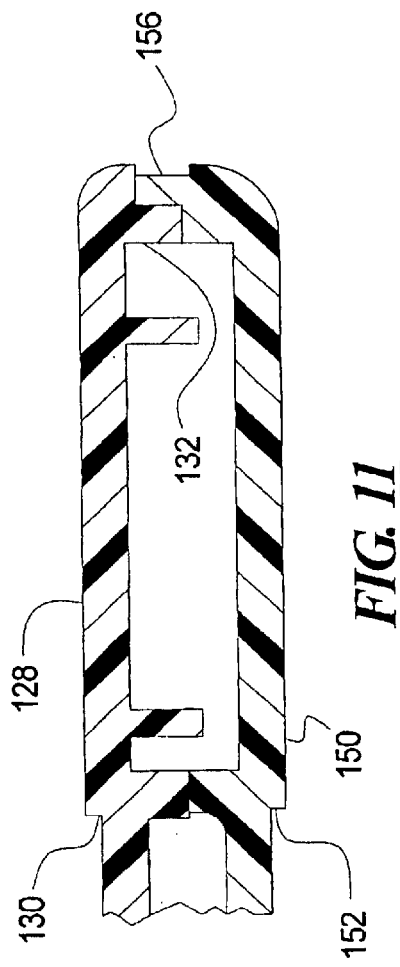
FIG. 11 is a detail view taken along line XI—XI in FIG. 10.

To further enhance the use of the clipboard 10, a sheet of paper 88 or other such template can be inserted into the gap 74 between the top panel 12 and the bottom panel 14, as is shown in FIG. 6. The scallop 60 of the bottom panel 14 defines a receiver 90 and eases the insertion of the paper 88 between the panels 12, 14. In this example, an entire sheet of paper 88 can fit between the writing section 32 and the holding section 62. If the top panel 12 is manufactured from a transparent material, any indicia on the paper 88 is visible through the writing section 32. The clip 18 itself can be used to secure any accompanying material to the top surface 28 of the top panel 12.

The sheet of paper 88 may, in one example, have indicia residing thereon that can help a student in his or her studies.

For example, the paper 88 may have letters of the alphabet which serve as a template to aid the student in learning to print. Further, the sheet of paper 88 can have mathematics problems so that a student can solve the problem directly on the clipboard instead of transferring the problem to a separate sheet of paper. In other examples, coaches of sporting teams, government agencies, military personnel, medical technicians, and the like could all use this technology to temporarily place markings on the writing section 32 with reference to a sheet of paper 88 inserted therein such as a checklist, a map, a game plan, etc.

A second example of a clipboard 100 is disclosed in FIGS. 8–11. The clipboard 100 includes a top panel 102, a bottom panel 104, and a clip assembly 106. The clipboard 100 can further include a hanger tab 108, at least one sheet of paper 110 or other such template, and a marker 112 disposed in the clip 106.

The top panel 102 includes a left edge 114, a right edge 116, a top edge 118, a bottom edge 120, a top face 122 and a bottom face 124. The top panel 102 further includes a writing section 126 and a pair of gripping sections 128 along the left and right edges 114, 116. The writing section 126 and the gripping sections 128 meet at a step 130. Thus, the writing section 126 is at a first elevation, and the gripping sections 128 are at a second elevation.

Extending downward from the gripping sections 128 along substantially the entire left, bottom, and right edges 114, 116, 120 is an energy director 132. Further extending downward from the bottom surface 124 of the gripping sections 128 are a series of posts (not shown).

Again, the top panel 102 can be manufactured from a material that can receive the markings of a dry erase marker 112, and that can then be swiftly and easily removed. Any substance known in the art used in dry erase boards, such as a polycarbonate, can be used. Further, it is desirable that the top panel 102 be manufactured from a transparent material.

The bottom panel 104 includes a left edge 134, a right edge 136, a top edge 138, a bottom edge 140, a top face 142, and a bottom face 144. The top edge 138 is curved toward the bottom edge 140 and defines a scallop 146. The bottom panel 104 also includes a holding section 148 and a pair of gripping sections 150 disposed along the left and right edges 134, 136 on either side of the holding section 148. In this example, the holding section 148 and the gripping sections 150 meet at a step 152. Thus, the holding section 148 is at a first elevation, and the gripping sections 150 are at a second elevation.

A series of locator holes 154 are disposed on the top face 142 of the gripping sections 150. The locator holes 154 of the bottom panel 104 have a diameter similar to the outside diameter of the posts of the top panel 102. Further, an energy director 156 extends upward from the top face 142 of the gripping sections 150 substantially along the entire left, bottom, and right edge 134, 136, 140.

Thus, when the top panel 102 is assembled to the bottom panel 104, the bottom face 124 of the top panel 104 is placed adjacent the top face 142 of the bottom panel 104, with the posts of the top panel 102 being inserted into the corresponding locator holes 154 of the bottom panel 104. The top panel 102 is thereby positively located and secured to the bottom panel 104. Further, the energy director 132 of the top panel 102 engages the energy director 156 of the bottom panel 104.

Due to the step 130 of the top panel 102 and the step 152 of the bottom panel 104, the writing section 126 and the holding section 148 are in a spaced relationship when assembled. Thus, a gap 158 with a distance d4 exists between the writing section 126 and the holding section 148. A panel height d5 is defined as the height between the top surface 122 of the top panel 102 and the bottom surface 144 of the bottom panel 104.

The gripping surfaces 150 define a height d6. The gripping surface height d6 can be greater than the panel height d5. This ensures that when the clipboard 100 is placed on or slid across a table or other setting, the bottom panel 104 will not be in contact with the table.

The top panel 102 can be secured to the bottom panel 104 by the known method of sonic welding. With sonic welding, the assembled top panel 102 and bottom panel 104 are subjected to high-frequency sound waves which vibrate the energy director 132 of the top panel 102 with the energy director 156 of the bottom panel 104 and cause friction and high, focused heat. This heat actually causes localized melting and welds the top panel 102 and the bottom panel 104 together along the respective energy directors. The process is very clean and allows for a strong, nearly unbreakable bond to be formed.

The second example has similar uses and advantages as the first example.

A third example of a clip board is disclosed in FIG. 12. The clipboard 180 includes a first panel 182, a second panel 184, and a clip 186 disposed on the first panel 182. The first panel 182 is connected to the second panel 184 along a joint 188.

The first panel includes a top edge 190, a bottom edge 192, a left edge 194, and a right edge 196. The second panel 184 includes a top edge 198, a bottom edge 200, a left edge 202, and a right edge 204. The first panel 182 is hingedly attached to the second panel 184 along their respective top edges 190, 198 at the joint 188. The joint 188 can be a living hinge that is constructed by molding the first panel 182 and the second panel 184 together with the joint 188 having a sufficiently thin cross section such that the first panel 182 and the second panel 184 may be flexed apart. In another example, a groove may be cut in the panels 182, 184 to create a flexible hinge. Other methods, including discrete hinges, will be known to those of skill in the art.

The clipboard 180 further includes a clip 186 with a front edge 206 and a rear edge 208. The clip 186 can be standard such that it is attached to the first panel 182 by fasteners such as screws or heat staking at its rear edge 208, and can be spring loaded such that the front edge 206 is rotatably biased against the face of the first panel 182 in a conventional manner.

On the bottom edge 192 of the first panel 182 is a first tab 210. The first tab 210 extends out from the first panel 182, and is accessible with regard to the second panel 184. On the bottom edge 200 of the second panel 184 is a second tab 211. The first panel 182 further includes snaps 212 near the bottom edge 192. The snaps 212 are placed into corresponding receivers 214 disposed in the second panel 184. Thus, to secure the first panel 182 to the second panel 184, the user simply inserts the snaps 212 into the receivers 214, as is known. To pull the first panel 182 away from the second panel 184, the user pushes the first tab 210 away from the second tab 211 and pushes the two panels 182, 184 apart. Once the first panel 182 is pushed away from the second panel 184, a sheet of paper (not shown) can be inserted between the two. After the paper has been inserted, the two panels 182, 184 can be snapped back together to ensure that the paper does not escape.

The first panel 182 can be manufactured from a transparent polycarbonate. Thus, any paper inserted between the first panel 182 and the second panel 184 is visible. Further, the first panel 182 can be manufactured from a material that also serves as a dry erase board. Thus, any marks made by a dry erase marker onto the first panel 182 can easily be wiped away.

In use, a teacher may distribute a worksheet to students. The worksheet can be placed between the first panel 182 and the second panel 184 of the clipboard 180. The student can then proceed to answer the questions by writing directly onto the first panel 182 of the clipboard 180 with a dry erase marker. After the teacher has reviewed the answers provided by the student, the first panel 182 of the clipboard can simply be wiped off. A new question sheet may then be provided the student, and the old question sheet provided by the teacher can then be reused by another student. Thus, there is very little paper used and none wasted.

In a fourth example shown in FIG. 13, a clipboard 220 is shown. The clipboard includes a first panel 220 with a top side 224, a bottom side 226, a front edge 228, a back edge 230, a left edge 232, and a right edge 234. The clipboard 220 further includes a conventional clip 236 as discussed earlier.

Disposed on the bottom side 226 of the first panel 222 is a holding sheet 238. The holding sheet 238 can be a flexible polymer and is attached to the first panel 222 along a seam 240 which runs along the left edge 232, the back edge 230, and the right edge 234. The holding sheet 238 is open along the front edge 228. The holding sheet 238 can be attached by any method known in the art, including heat sealing, adhesive, or the like.

Because the holding sheet 238 is open along the front edge 228, a pocket 242 is formed, and a sheet of paper (not shown) can be inserted into the pocket 242. The pocket 242 can be sized to be only slightly larger than a typical sheet of paper, and therefore hold the paper within the pocket 242 against the bottom side 226 of the first panel 222 using friction. Again, the clipboard 220 can be transparent and made of a material such that the marks left by a dry erase marker can be easily wiped off.

From the foregoing, one of ordinary skill in the art will appreciate that the present disclosure sets forth a device for a transparent, erasable clipboard. However, one of ordinary skill in the art could readily apply the novel teachings of this disclosure to any number of situations. As such, the teachings of this disclosure shall not be considered to be limited to the specific examples disclosed herein, but to include all applications within the spirit and scope of the invention.

We claim:

1. A dry erase panel assembly for use as a teaching aid, comprising:
    a first panel with a top edge, a bottom edge, a left edge, and a right edge, the first panel including a writing section that is adapted to eraseably receive markings thereon;
    a second panel with a top edge, a bottom edge, a left edge, a right edge, and a holding section, the second panel secured to the first panel along the left edge and the right edge, the holding section being spaced from the writing section to define a gap therebetween adapted to receive an information template; and
    a pair of fastening sections extending along the right and left edges of the first panel, wherein the fastening sections of the first panel are integral with and in stepped relation to the writing section.

2. The assembly of claim 1, the second panel further including a pair of fastening sections extending along the right and left edges and a holding panel, the fastening sections of the second panel being in stepped relation with the holding section, and wherein the fastening sections of the first panel overly the fastening sections of the second panel.

3. The assembly of claim 2, the fastening section of the first panel including a rim, the fastening section of the second panel including a hole adapted to receive the rim.

4. The assembly of claim 1, further including a clip.

5. The assembly of claim 4, the clip further including a receiver adapted to hold a marking instrument.

6. The assembly of claim 1, further comprising grips disposed along the left and right edges of the first and second panels.

7. The assembly of claim 6, wherein the second panel further comprises a pair of fastening sections extending along the left and right edges, the fastening sections being in stepped relation with the holding panel, the fastening sections further including flow holes.

8. The assembly of claim 7, the grips being overmolded onto the fastening sections such that grip material is within the flow holes.

9. The assembly of claim 6, the grips defining a grip height, the distance across the first panel and the second panel defining a panel height, the grip height being larger than the panel height.

10. The assembly of claim 6, the grips including indicia adapted to direct attention to the writing section.

11. The assembly of claim 1, the second panel including a scallop defining a receiver.

12. The assembly of claim 1, wherein the first panel is transparent.

13. The assembly of claim 12, wherein the second panel is transparent.

14. The assembly of claim 1, wherein the second panel is a flexible polymer.

15. The assembly of claim 1, wherein the first panel and the second panel are attached by sonic welding.

16. The assembly of claim 1, wherein the second panel includes a scallop along the top edge.

17. A clipboard panel assembly, comprising:
a first panel with a top edge, a bottom edge, a left edge, and a right edge, a writing section, the writing section adapted to dry eraseably receive markings thereon, and a pair of fastening sections integral with and disposed along the left and right edges;
a second panel with a top edge, a bottom edge, a left edge, a right edge, a holding section, and a pair of fastening sections integral with and disposed along the left and right edges, wherein the left edge fastening section of the second panel abuts and is fastened to the left edge fastening section of the first panel, and the right edge fastening section of the second panel abuts and is fastened to the right edge fastening section of the first panel;
a pair of grips, one each disposed around the joined left edge fastening sections and the joined right edge fastening sections; and
wherein at least the writing section is transparent and in spaced relation to the holding section to define a gap therebetween.

18. The assembly of claim 17, the grips defining a first height, the distance across the first panel and the second panel defining a second height, the first height being greater than the second height.

19. The assembly of claim 17, wherein the second panel includes a scallop along the top edge.

20. A clipboard assembly, comprising:
a first panel with a top edge, a bottom edge, a left edge, a right edge, a writing section, the writing section adapted to eraseably receive markings thereon, a pair of fastening sections disposed along the left and right edges, and at least one upper member extending away from each fastening section of the first panel;
a second panel with a top edge, a bottom edge, a left edge, a right edge, a holding section, and a pair of fastening sections disposed along the left and right edges, and at least one lower member extending away from each fastening section of the second panel the fastening sections of the second panel being disposed on the fastening sections of the first panel;
wherein the upper member of the first panel engages the lower member of the second panel;
wherein the first panel is cabable of being bonded to the second panel due to localized melting between the upper member and the lower member; and
wherein the writing section is transparent and in spaced relation to the holding section to define a gap therebetween.

21. The assembly of claim 20, wherein the second panel includes a scallop along the top edge.

22. The assembly of claim 20, wherein the fastening section of the first panel is in stepped relation to the writing section.

23. The assembly of claim 22, wherein the fastening section of the second panel is in stepped relation to the holding section.

* * * * *